US012201990B2

(12) United States Patent
Bordi et al.

(10) Patent No.: US 12,201,990 B2
(45) Date of Patent: Jan. 21, 2025

(54) GRATE SUPPORT ELEMENT AND OPEN-ENDED GRINDING MILL

(71) Applicant: Metso Outotec Finland Oy, Tampere (FI)

(72) Inventors: Damon Bordi, Hillarys (AU); Martin Vettorato, Karlskoga (SE)

(73) Assignee: Metso Finland Oy, Espoo (FI)

( * ) Notice: Subject to any disclaimer, the term of this patent is extended or adjusted under 35 U.S.C. 154(b) by 267 days.

(21) Appl. No.: 17/789,384

(22) PCT Filed: Dec. 30, 2019

(86) PCT No.: PCT/FI2019/050926
§ 371 (c)(1),
(2) Date: Jun. 27, 2022

(87) PCT Pub. No.: WO2021/136863
PCT Pub. Date: Jul. 8, 2021

(65) Prior Publication Data

US 2023/0034524 A1 Feb. 2, 2023

(51) Int. Cl.
*B02C 17/18* (2006.01)

(52) U.S. Cl.
CPC ................................ *B02C 17/1855* (2013.01)

(58) Field of Classification Search
CPC .. B02C 17/1855; B02C 17/1835; B02C 17/04
See application file for complete search history.

(56) References Cited

U.S. PATENT DOCUMENTS

| | | | | |
|---|---|---|---|---|
| 1,690,493 | A | 11/1928 | Marcy | |
| 2,023,331 | A * | 12/1935 | Lowenhielm | B02C 17/1855 241/70 |
| 3,739,993 | A | 6/1973 | Nelson et al. | |
| 4,646,980 | A * | 3/1987 | Player | B02C 17/1855 241/179 |

(Continued)

FOREIGN PATENT DOCUMENTS

| | | | |
|---|---|---|---|
| CN | 2553889 | Y | 6/2003 |
| CN | 106378238 | B | 9/2018 |

(Continued)

OTHER PUBLICATIONS

Extended European Search Report for European Application No. 19958291, dated Sep. 13, 2023.

(Continued)

*Primary Examiner* — Faye Francis
(74) *Attorney, Agent, or Firm* — Andrus Intellectual Property Law, LLP

(57) ABSTRACT

A grate support element for supporting a grate of an open-ended grinding mill that includes an outer perimeter section, an inner section, and at least one vane extending between the outer perimeter section and the inner section. The grate support element further includes a mounting flange at the outer perimeter of the grate support element configured to enable mounting of the grate support element to a shell of the grinding mill at an area of the shell not intruding to the grinding mill volume. The mounting flange extends outwards from the middle of the cross section of the grinding mill.

17 Claims, 4 Drawing Sheets

(56) References Cited

U.S. PATENT DOCUMENTS

| | | | | | |
|---|---|---|---|---|---|
| 5,361,997 | A * | 11/1994 | Burkes | B02C 17/1855 | 241/70 |
| 6,663,030 | B2 * | 12/2003 | Washburn | B02C 17/1855 | 241/70 |
| 8,109,457 | B2 * | 2/2012 | Latchireddi | B02C 17/1855 | 241/70 |
| 9,289,775 | B2 * | 3/2016 | Mepham | B02C 17/1835 | |
| 10,427,164 | B2 * | 10/2019 | Mepham | B02C 17/1855 | |
| 10,814,331 | B2 * | 10/2020 | Canabes Guerra | B02C 17/1855 | |
| 11,123,741 | B2 * | 9/2021 | McPhee | B02C 13/282 | |
| 11,666,923 | B2 * | 6/2023 | Kumar | B02C 17/22 | 241/46.01 |
| 2003/0178516 | A1 * | 9/2003 | Washburn | B02C 17/1855 | 241/69 |
| 2011/0146933 | A1 * | 6/2011 | Page | B02C 17/1855 | 162/232 |
| 2014/0138466 | A1 * | 5/2014 | Mepham | B02C 17/1835 | 241/70 |
| 2017/0144165 | A1 * | 5/2017 | Latchireddi | B02C 17/1855 | |
| 2020/0023373 | A1 * | 1/2020 | McPhee | B02C 17/1855 | |

FOREIGN PATENT DOCUMENTS

| | | | |
|---|---|---|---|
| CN | 109092454 | A | 12/2018 |
| CN | 209715271 | U | 12/2019 |
| EP | 0941764 | A1 | 9/1999 |
| GB | 317769 | A | 11/1930 |
| WO | 2009143615 | A1 | 12/2009 |

OTHER PUBLICATIONS

International Search Report and Written Opinion for PCT Application No. PCT/FI2019/050926, mailed Apr. 29, 2020.

International Preliminary Report on Patentability for PCT Application No. PCT/FI2019/050926, mailed Feb. 16, 2022.

* cited by examiner

GRATE SUPPORT ELEMENT AND OPEN-ENDED GRINDING MILL

CROSS-REFERENCE TO RELATED APPLICATIONS

This application is the U.S. national stage application of International Application PCT/FI2019/050926, filed Dec. 30, 2019, which international application was published on Jul. 8, 2021, as International Publication WO 2021/136863 A1 in the English language.

BACKGROUND

The present invention relates to open-ended grinding mills, and more particularly to grate support elements in open-ended grinding mills.

Grinding mills, specifically semi autogenous and autogenous mills, rely on their ability to generate impact breakage of the ore charge and transport the ground material through the discharge pulp lifters out of the mill. It is common with increasing mill diameters and flow rates for the discharge arrangement to restrict the performance of the mill by limiting material transfer rates and grinding efficiency. This is due to an inability to transport the ground material through the grate and pulp lifters limiting the transfer rate due to slurry flow back/short circuiting and carry over. The impact of this restriction in mill flow rate is a reduction in mill performance (product size) due to the resulting slurry pool which dissipates the energy of the balls/ore impacting the toe of the charge.

Open-ended mills can provide a solution to this problem removing the need for pulp lifters such that slurry can flow unhindered though the grate and out of the mill. However, this approach has been limited to very small grinding mills, as the open-ended design, and especially grates used in such open-ended grinding mills, have not been sufficiently stiff to support larger charge loads. One way to solve this has been providing a vertical, spider-like support structure at the discharge end of the grinding mill. However, the prior art support structure configurations require providing the grinding mill shell with a discharge end shell flange that intrudes into the mill volume, since it has been necessary to mount the spider to the mill body at such a flange. This has several drawbacks. Firstly, it creates a critical surface susceptible to wear. Secondly, it closes some of the mill end open area thereby reducing the discharge throughput efficiency. Thirdly, the configuration above also creates a stiffness discontinuity at the discharge shell flange, which produces high local stresses and flange openings.

BRIEF DESCRIPTION OF THE INVENTION

An object of the present invention is to provide a new grate support element and a new open-ended grinding mill. The objects of the invention are achieved by a grate support element and an open-ended grinding mill, which are characterized by what is stated in the independent claims. Some preferred embodiments of the invention are disclosed in the dependent claims.

The current solution is based on the idea of providing the grate support structure with means for mounting the grate support structure to the outer face of the discharge end shell flange.

An advantage of the current solution is that no discharge end shell flange described above is needed, whereby problems related to it can be avoided. It also makes replacing the grate support structure considerably easier, since the grate support structure can be unmounted from the outside of the grinding mill volume, for example.

BRIEF DESCRIPTION OF THE DRAWINGS

In the following the invention will be described in greater detail by means of preferred embodiments with reference to the attached [accompanying] drawings, in which.

The drawings are for illustrative purposes only and are not shown is scale. For the sake of clarity, not all the similar features have been numbered in the figures.

DETAILED DESCRIPTION OF THE INVENTION

Figure 1:
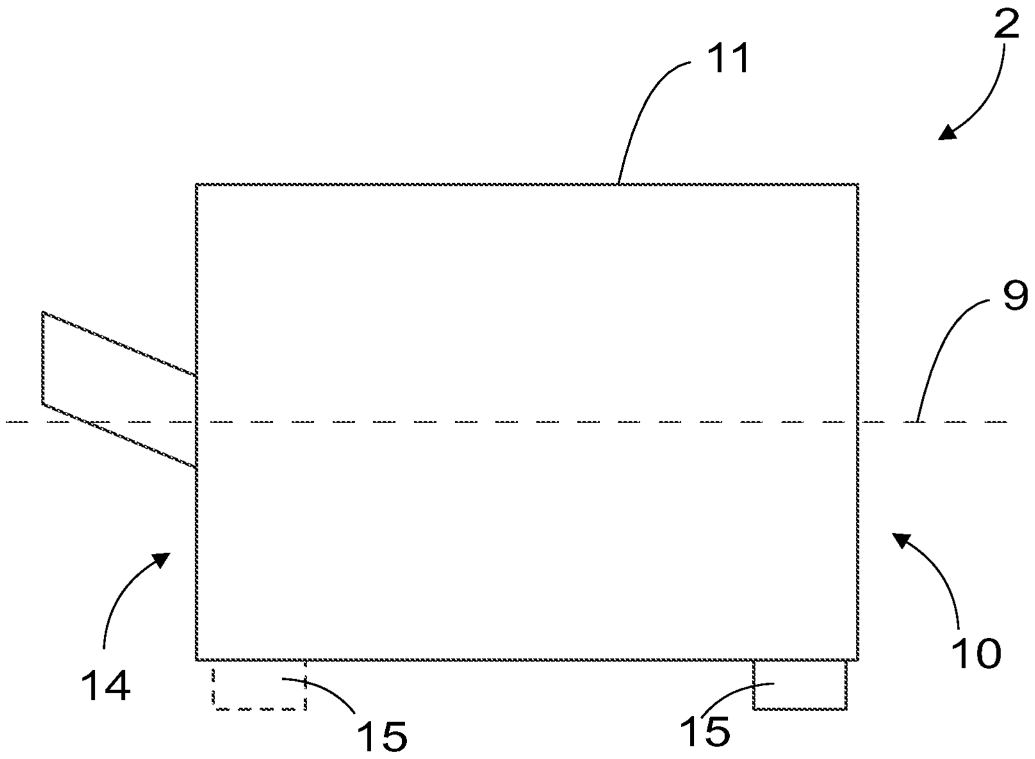
FIG. 1 illustrates schematically a grinding mill seen from a side.
Figure 2:
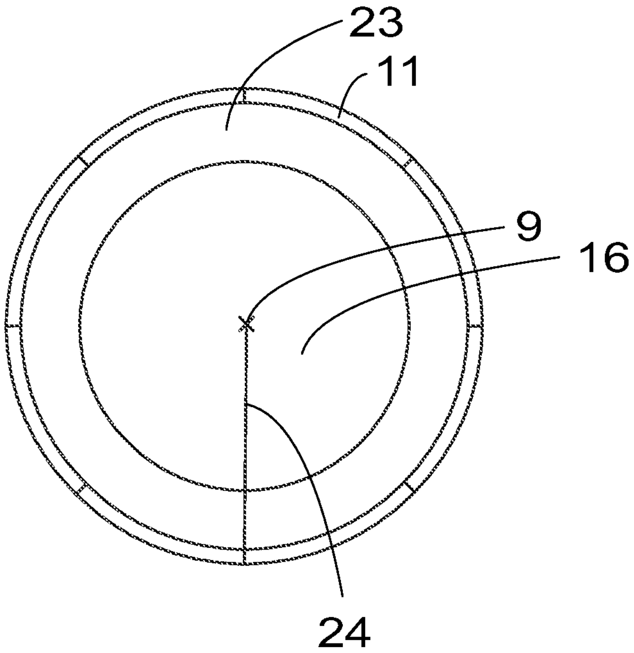
FIG. 2 illustrates schematically an open-ended grinding mill seen from the second end.

FIG. 1 illustrates schematically a grinding mill 2. FIG. 2 illustrates schematically a grinding mill 2 seen from a second end 10, in other words the discharge end 10 of the grinding mill. FIGS. 1 and 2 only show some features of the grinding mill 1 that help understanding the current solution. It is clear for a person skilled in the art that a grinding mill may and usually does comprise other features as well.

A grinding mill 2, such as the grinding mill of FIG. 1, comprises a drum comprising a cylindrical shell 11. In a grinding mill 2 of the current solution, the longitudinal axis 9 of the drum is arranged in a substantially horizontal position in a use position of the grinding mill 2. The longitudinal axis 9 of the drum refers to the axis extending along the centre line of the shell 11 from one end of the cylinder-shaped shell to another. Horizontal position refers to the longitudinal axis 9 extending in a substantially horizontal direction. In other words, the longitudinal axis 9 extends in a direction that is closer to a horizontal direction than a vertical direction. The use position refers to a position the grinding mill 2 is arranged in when used for grinding, for instance for ore grinding, in a production environment.

The drum comprises a first end 14 at the feed end of the shell and a second end at the discharge end 10 of the shell. The feed end refers to the end at which the material to be ground is fed into the drum. The discharge end refers to the end at which the ground material is discharged from the drum. In wet grinding applications the discharged material comprising ground material and possibly liquids is also called slurry in this application.

The grinding mill 2 may comprise various process duties including but not limited to a ball mill, a pebble mill, an autogenous mill (AG mill), or a semi-autogenous mill (SAG mill). Working principles of such grinding mills are known and are not explained in more detail in this description.

The grinding mill 2 typically further comprises a bearing 15 supporting the drum at the discharge end 10. The bearing 15 may comprise any suitable type of bearing, such as a rolling element bearing, a hydrostatic bearing or a hydrodynamic bearing. It should also be noted that the grinding mill 2 may also have additional bearings supporting the drum and/or other parts of the grinding mill 2. Such bearings 15 for supporting the drum of the grinding mill are known as such and are not explained in more detail.

The grinding mill 2 may be an open-ended grinding mill. Open-ended grinding mill refers to a grinding mill that does not have a discharge trunnion, pulp lifters to lift the ground material to the discharge trunnion or a solid discharge head plate. An open-ended grinding mill may comprise a discharge grate 16 instead of the discharge trunnion, pulp lifter and solid discharge head plate, whereby the ground material is discharged through the discharge grate 16. In a fully open-ended grinding mill, there is no need to lift the ground material to discharge it. According to another embodiment, the open-ended grinding mill 2 may comprise a partial head plate 23 at the discharge end. Such a grinding mill may also be called a semi-open-ended grinding mill. A semi-open-ended grinding mill may be similar to the fully open-ended grinding mill, but it may have a partial head plate 23 at the discharge end of the shell extending partially from a perimeter of the shell 11 towards the longitudinal axis 9 of the drum, but without a discharge trunnion and no traditional pulp lifters. The partial head plate 23 at the discharge end 10 of the shell 11 may extend a distance of preferably less than 50 percent, more preferably less than 30 percent and most preferably less than 15 percent of the length the radius 24 of the shell from the edge of the shell 11 towards the longitudinal axis 9 of the drum. The area of the discharge end 10 of the drum extending from the inner edge of the partial head plate 23 towards the longitudinal axis 9 of the drum may define a discharge opening. The discharge opening may be provided with a discharge grate 16. In both types of open-ended grinding mills, in other words in both fully open-ended and semi-open-ended grinding mills, the ground material may, thus, be discharged from the discharge grate 16 straight to the atmosphere.

Figure 3:
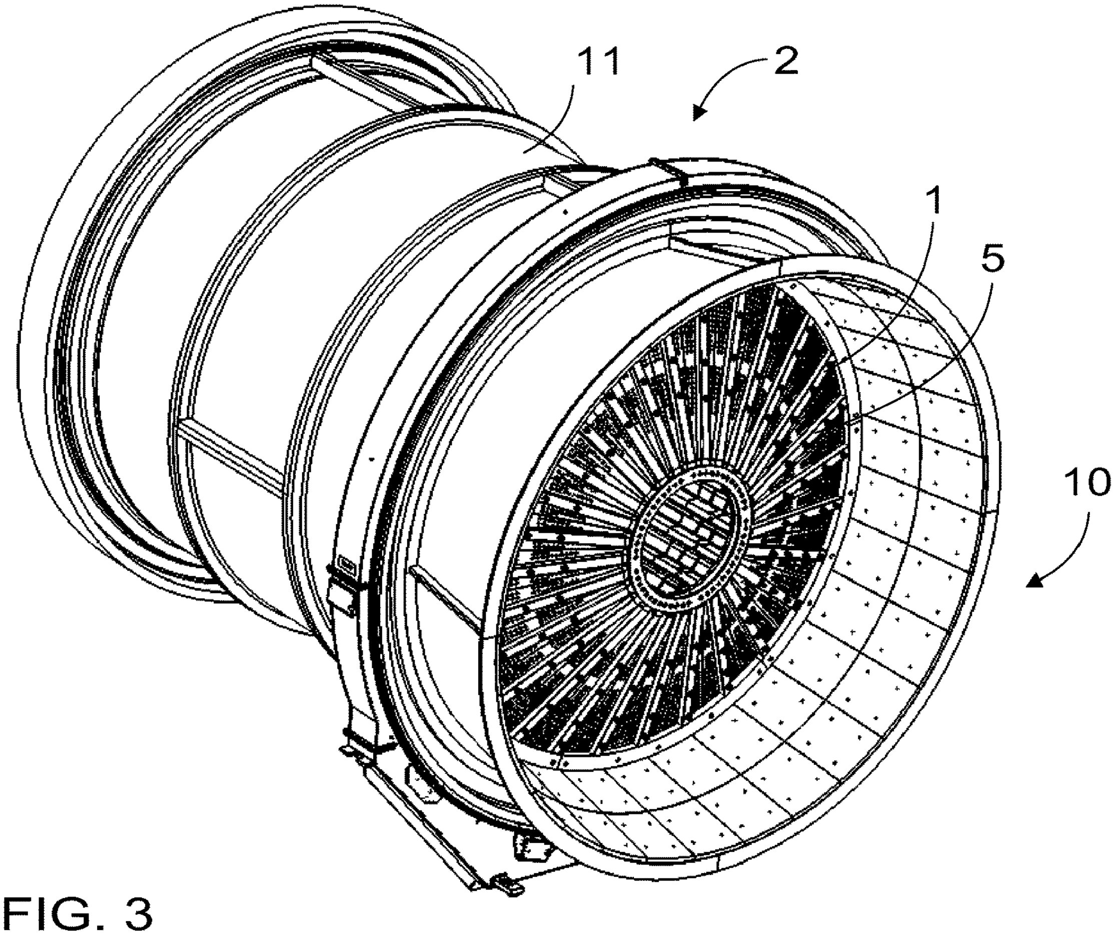
FIG. 3 shows a part of an open-ended grinding mill in perspective.
Figure 4:
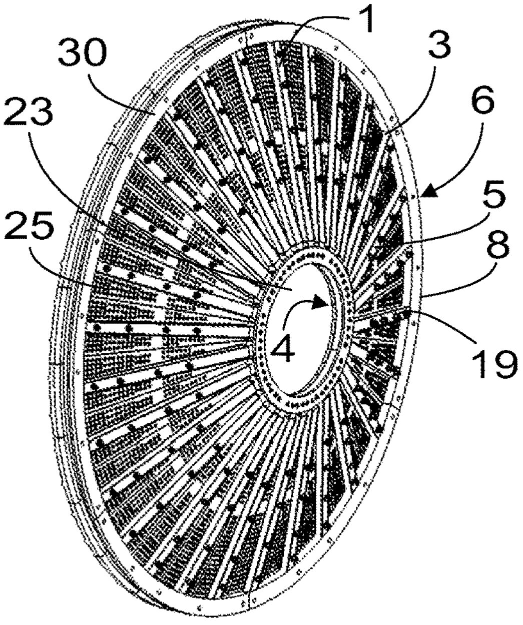
FIG. 4 shows a detail from a discharge end of an open-ended grinding mill in perspective.
Figure 5:
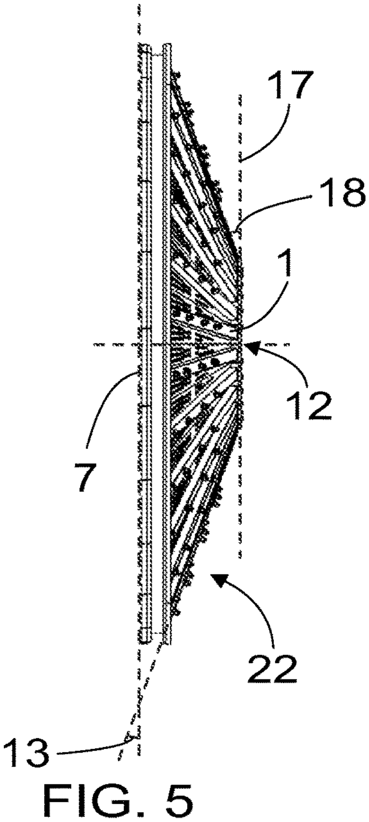
FIG. 5 shows a detail from a discharge end of an open-ended grinding mill shown from a side of the grinding mill.
Figure 6:
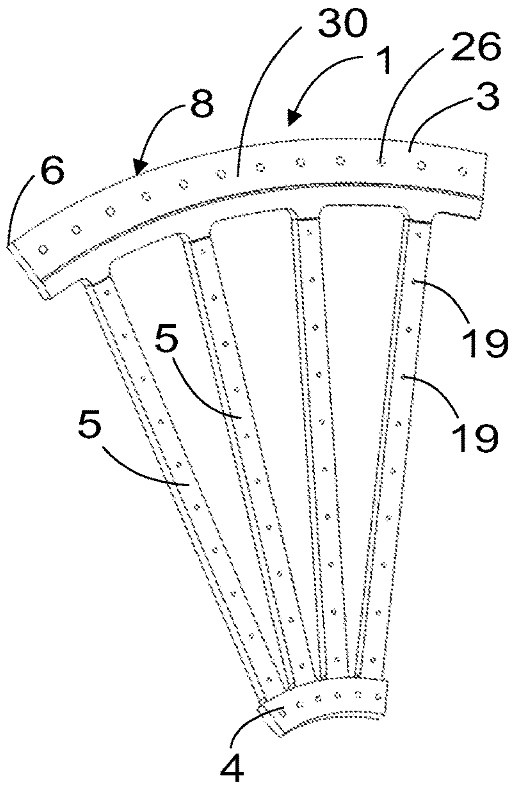
FIG. 6 shows a grate support element according to an example of an embodiment.
Figure 7:
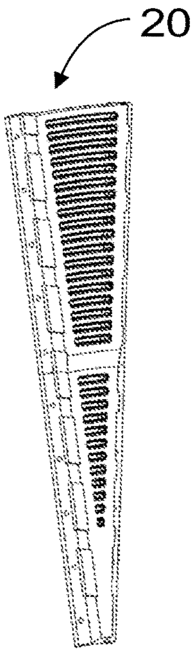
FIG. 7 shows a grate panel according to an example of an embodiment.

FIG. 3 shows a part of a grinding mill 2, more particularly a part of an open-ended grinding mill 2, in perspective, FIG. 4 shows a detail from a discharge end of an open-ended grinding mill in perspective, and FIG. 5 shows a detail from a discharge end of an open-ended grinding mill shown from a side of the grinding mill. FIG. 6 shows a grate support element according to an example of an embodiment, and FIG. 7 shows a grate panel according to an example of an embodiment.

According to an aspect and referring to the FIGS. 3 to 7, for example, a grate support element 1 for an open-ended grinding mill 2 may comprise an outer perimeter section 3, an inner section 4, and at least one vane 5. The vane 5 may be configured to extend between the outer perimeter section 3 and the inner section 4, for instance in a direction radial with respect to the outer perimeter 6 of the grate support element 1 or in a curved manner.

The grate support element 1, thus, refers to an element configured to be mounted at a discharge end 10 of a shell 11 of the open-ended grinding mill 2 and to support one or more grate panel(s) of the open-ended grinding mill 2. The inner section 4 refers to the section of the grate support element 1, which is provided at the end of the grate support element 1 that is directed towards the middle 12 of the cross section of the grinding mill 2 at the discharge end 10, when the grate support element 1 is mounted to the grinding mill 2. Similarly, the outer perimeter section 3 refers to the section of the grate support element 1, which is provided at the end of the grate support element 1 that is directed away from the middle 12 of the cross section of the grinding mill 2 at the discharge end 10, when the grate support element 1 is mounted to the grinding mill 2, in other words at the distal end of the grate support element 1.

Figure 8:
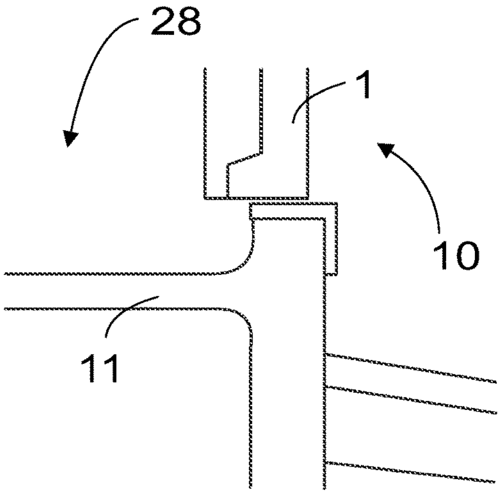
FIG. 8 (Prior art)
FIG. 8 shows a detail of a prior art grinding mill.
Figure 9:
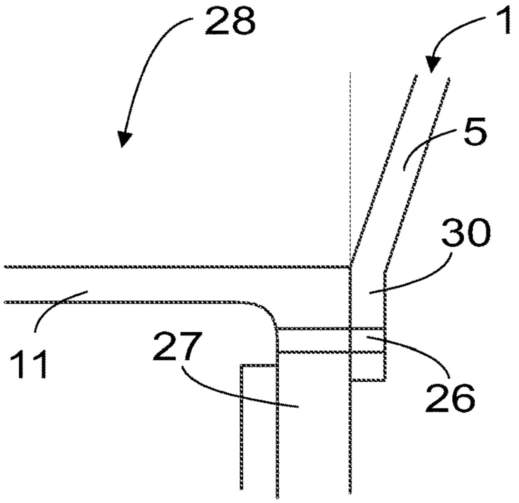
FIG. 9 shows a detail of a grinding mill according to a first example of an embodiment the current solution.

FIG. 8 shows a detail of a prior art grinding mill at the discharge end and FIG. 9 shows a detail of a grinding mill according to the current solution at the discharge end.

According to an aspect, a grate support element 1 for supporting a grate 25 of an open-ended grinding mill 2 comprises an outer perimeter section 3 directed towards a middle 12 of the cross section of the grinding mill 2 in the transverse direction of the grinding mill 2, an inner section 4 directed away from the middle 12 of the cross section of the grinding mill 2 in the transverse direction of the grinding mill, and at least one vane 5 extending between the outer perimeter section 3 and the inner section 4 in such a manner that the vane 5 has an inner section side end connected to the inner section 4 and an outer perimeter section side end connected to the outer perimeter section 3. The vane 5 extending between the outer perimeter section 3 and the inner section 4 in such a manner that the vane 5 has an inner section side end connected to the inner section 4 and an outer perimeter section side end connected to the outer perimeter section 3 refers to the vane having a first end at the outer perimeter section and another end a second end at the inner section of the grate support element.

The grate support element 1 further comprises a mounting flange 30 at the outer perimeter of the grate support element 1. The mounting flange 30 is configured to enable mounting of the grate support element 1 to a shell 11 of the grinding mill 2 at an area of the shell not intruding to the grinding mill volume 28. The mounting flange 30 extends outwards from the middle 12 of the cross section of the grinding mill 2. In other words, the mounting flange 30 extends from the outer perimeter end of the vane 5 in a direction directed outwards from the middle 12 of the cross section of the grinding mill 2. Thus, the mounting flange 30 forms a flange with a shape of a ring or a section of a ring at the outer perimeter section 3 part of the grate support element 1. Thereby, the mounting flange 30 is configured to extend beyond the inner perimeter of the shell 11 at the discharge end 10 and not to extend to the area of the discharge end opening of the shell 11, when the grate support element 1 is mounted to the grinding mill 2, for example to the shell 11. Thus, the mounting flange 30 is configured to be mounted to the discharge end face of the grinding mill 2, and the shell 11, and not to protrude into the inside or inner volume 28 of the shell 11, when the grate support element 1 is mounted to the grinding mill 2 via the mounting flange 30.

Figure 10:
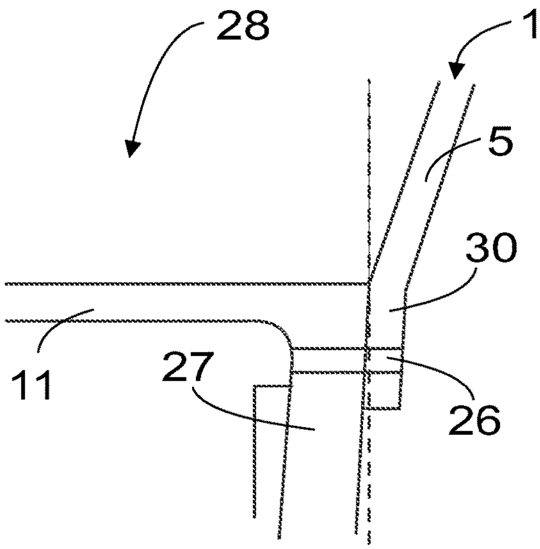
FIG. 10 shows a detail of a grinding mill according to a second example of an embodiment the current solution.
Figure 11:
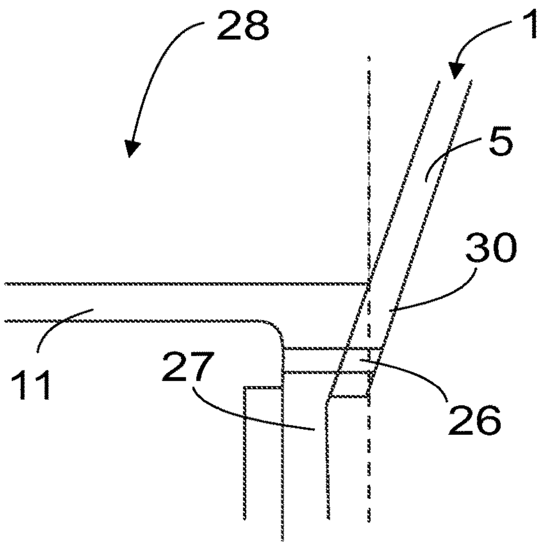
FIG. 11 shows a detail of a grinding mill according to a third example of an embodiment the current solution.

According to an embodiment, the mounting flange 30 is configured to extend in a radial direction of the grate 25. An example of such an embodiment is shown in FIG. 9, for example. According to another embodiment, the mounting flange 30 is configured to extend in a direction angled with respect to a radial direction of the grate 25, when the grate support element 1 is mounted in the grinding mill 2. An example of such an embodiment is shown in FIG. 10, where the radial direction of the grate is shown by a dashed line. According to an embodiment, the angle of the mounting flange 30 may be equal to the angle of the vane 5 at the outer perimeter section side end of the vane. An example of such an embodiment is shown in FIG. 11, where the radial direction of the grate is shown by a dashed line. According to another embodiment, the angle of the mounting flange 30 may be different from the angle of the vane 5 at the outer perimeter section side end of the vane 5, such as in FIG. 10. The radial direction of the grate 25 refers to a direction parallel to the plane 7 and extending from the middle 12 of the cross section of the grinding mill 2 towards an outer perimeter of the grate 25. Typically, in a use position of the grinding mill, the plane 7 is vertical.

According to an embodiment, the mounting flange 30 is provided with flange openings 26 for bolts for mounting the grate support. The flange openings 26 may be configured to extend through the mounting flange 30 in a horizontal direction, when the grate support element 1 is mounted in the grinding mill 2. In other words, the flange openings 26 may be configured to extend in the longitudinal direction of the grinding mill 2, when the grate support element 1 is mounted to the grinding mill 2. According to another embodiment, at least some of the flange openings 26 may be configured as blind holes.

According to an embodiment, the mounting flange 30 is configured to extend outwards beyond a diameter of an inner volume 28 of the shell 11 of the grinding mill 2, when the grate support element 1 is mounted in the grinding mill 2. In other words, the mounting flange 30 is configured not to protrude to the area inside the inner perimeter of the cylindrical shell 11 of the grinding mill 2, when the grate support element 1 is mounted to the grinding mill 2. This has many benefits including not limiting the flow of ground material and avoiding a surface of high wear and a point of stiffness discontinuity at the discharge end of the shell 11.

According to an embodiment, the grate support element 1 comprises a mounting surface parallel to the end of the of the shell 11 of the grinding mill 2. Preferably, this mounting surface comprises a surface within the area of the mounting flange 30. More preferably, this mounting surface comprises a surface within the area of the mounting flange 30 configured to be directed towards the shell 11, when the grate support element 1 is mounted to the grinding mill 2, such as to the discharge end of the shell.

According to an embodiment, the vane 5 extends between the outer perimeter section 3 and the inner section 4 in a direction radial with respect to the cross section of the grinding mill 2 in the transverse direction. In such an embodiment, the vanes 5 may thus be configured to extend radially from the outer perimeter of the discharge end of the shell 11, when a plurality of grate support elements 1 or one or more grate support elements 1 comprising a plurality of vanes 5 are mounted to the grinding mill 2.

According to an embodiment, the vane 5 extends between the outer perimeter section 3 and the inner section 4 in a curved manner. In such embodiments, the vanes may be configured to curve for instance in a direction of a plane defined by the vanes 5 or in a direction transverse to the direction of the plane defined by the vanes 5. The plane defined by the vanes refers to a plane defined by the direction, in which the vane 5 extends from the outer perimeter section 3 towards the inner section 4. Thus, a curve in a direction of the plane refers to the vane being curved, or angled, with respect to the radial direction directed from the outer perimeter edge 8 towards the middle 12 of the of the cross section of the grinding mill 2, when the grate support element 1 is mounted to a grinding mill 2. The vane 5 may for instance be configured to extend from the outer perimeter section 3 towards the inner section in a spiralling manner. Similarly, a curve in a direction transverse to the direction of the plane defined by the vanes 5 refers to the vane 5 being configured to be curved towards and/or outwards from the volume of the grinding mill 2, when mounted to the grinding mill 2. According to an embodiment, the angle or the curvature may vary along the length of the vane 5.

According to an embodiment, an open-ended grinding mill 2 comprises a shell 11 comprising an inner volume 28 for material to be ground and at least one grate support element 1 according to an embodiment described in this description, or a combination of such embodiments, mounted to the shell at a discharge end 10 of the grinding mill 2. According to an embodiment, the shell 11 comprises a shell flange 27 extending in a radial direction away from the inner volume of the shell 11, and the grate support element 1 is mounted via the mounting flange 30 to the shell flange 27.

According to an embodiment, the mounting flange 30 and the shell flange 27 are provided with flange openings 26 for bolts for mounting the grate support element 1 to the shell 11. Preferably, at least some of the flange openings 26 are configured to be aligned when the grate support element 1 is mounted to the shell 11. The flange openings 26 in the mounting flange 30 and in the shell flange 26 are preferably configured to extend through the mounting flange 30. The grate support element 1 is preferably mounted to the shell 11 by bolts extending in a horizontal direction through the flange openings 26 in both the mounting flange 30 and the shell flange 27, when the grate support element 1 is mounted in the grinding mill 2 and the grinding mill 2 is in a use position.

According to an embodiment, the vane 5 is provided with at least two vane openings 19 along its length for attaching the grate support element 1 to a grate panel 20.

According to an embodiment, the vane 5 may be angled with respect to a plane 7 defined by the outer edge 8 of the outer perimeter section 3 in such a manner that the inner section 4 is configured to be provided outwards from the plane 7 defined by the outer edge 8 of the outer perimeter section 3, when the grate support element 1 is mounted to the open-ended grinding mill 2. Thus, the vane 5 may be angled with respect to a plane defined by the outer perimeter of the grate support element 1. In other words, the inner section 4 may protrude outwards from the grinding mill volume 28, when the grate support element 1 is mounted to the open-ended grinding mill 2, more particularly at a discharge end 10 of the open-ended grinding mill 2.

According to another embodiment, the grate support element 1 may be flat. In other words, the vane 5 may extend in a direction parallel, or substantially parallel, to the plane 7 defined by the outer edge 8 of the outer perimeter section 3, instead of being angled to the plane. In such an embodiment, the grate support element 1 in its entirety may, thus, be configured to be positioned into a vertical position when mounted to the grinding mill 2, instead of protruding outwards from the volume 28 of the grinding mill 2. The embodiments may otherwise be similar to one another and comprise similar features and combinations thereof.

According to an embodiment, the angle 13 between the vane 5 and the plane 7 defined by the outer edge 8 of the outer perimeter section 3 is in the range of 5 to 30 degrees. In other words, the vane 5 protrudes outwards from the grinding mill volume, in other words from the inside of the shell 11, at an angle 13 in the range of 5 to 30 degrees, when the grate support element 1 is mounted to the open-ended grinding mill 2, more particularly at a discharge end 10 of the open-ended grinding mill 2.

According to an embodiment, the angle 13 between the vane 5 and the plane 7 defined by the outer edge 8 of the outer perimeter section 3 may vary at one, two or more points along the length of the vane or continuously over the length of the vane. In other words, the angle 13 between the vane 5 and the plane 7 defined by the outer edge 8 of the outer perimeter section 3 may be different at different portions of the length of the vane 5 along the length of the vane 5 extending from the outer perimeter section 3 towards the inner section 4. According to another embodiment, the angle 13 between the vane 5 and the plane 7 defined by the outer edge 8 of the outer perimeter section 3 may be arranged to vary continuously over the length of the vane 5. In such an embodiment, the vane 5 may thus be angled in a curved manner with respect to the plane 7 defined by the outer edge 8 of the outer perimeter section 3. In a further embodiment, the vane 5 may comprise a same angle with respect to the plane 7 defined by the outer edge 8 of the outer perimeter section 3 along a first portion of the length of the vane 5 and a continuously varying angle along a second portion of the length of the vane 5.

According to an embodiment, the grate support element 1 comprises a shape of a conical wheel or a conical disc, or a shape of a section of a conical wheel or a conical disc. The grate support element 1 comprising a shape of a section of a conical wheel or a conical disc refers to such a shape that a plurality of grate support elements 1 arranged adjacently to one other in such a manner, that their inner sections 4 are directed to a common middle point and their outer perimeter sections 3 are directed away from the common middle point, form a conical wheel shape or a conical disc shape.

According to an embodiment, the vane 5 may be angled with respect to a second plane 17 defined by the inner section 4, in addition to being angled with respect to the plane 7 defined by the outer perimeter section 3. Depending on the embodiment, the plane 7 defined by the outer perimeter section 3 may or may not be parallel with respect to the second plane 17 defined by the inner section 4. In other words, the second angle 18 between the vane 5 and the second plane 17 defined by the inner section 4 may be the same as the angle 13 between the vane 5 and the plane 7 defined by the outer perimeter section 3, such as in FIG. 5, for example, or it may be different.

According to another embodiment, the vane 5 may not be angled with respect to a second plane 17 defined by the inner section 4. In other words, the inner section 4 and the vane 5 may have the same angle with respect to the plane 7 defined by the outer perimeter section 3.

According to an embodiment, the inner section 4 connecting the vanes 5 at the middle end of the grate support element 1 is configured to form a ring-like inner perimeter for the grate support element, such as in the embodiments of FIGS. 3 to 6. According to another embodiment, the inner section 4 connecting the vanes 5 at the middle end of the grate support element 1 is configured to form a solid round centre part for the grate support element 1.

According to an embodiment, the grate support element 1 and a grate panel 20 are attached fixedly to one another to form a uniform structure. According to another embodiment, one grate support element 1 alone forms a grate support structure 22.

According to an embodiment, a grate support structure 22 comprises at least two grate support elements 1 described in this description and the accompanying drawings.

According to an embodiment, an open-ended grinding mill 2 comprises a grate support structure 22 and/or at least one grate support element 1 described in this description. According to an embodiment, such an open-ended grinding mill 2 further comprises a grate 25 and a cylindrical shell 11, and the grate support structure 22 is mounted to the grate 25 and the cylindrical shell 11. According to a further embodiment, the grate support structure 22 is mounted removably at least to the cylindrical shell 11.

According to an embodiment, in an open-ended grinding mill 2 described in this description, the middle part of the grate support structure 22 comprising the inner section of the grate support structure 22 extends outwards from the cylindrical shell. More particularly, in such an embodiment, the middle part of the grate support structure 22 comprising the inner section of the grate support structure 22 extends outwards from the cylindrical shell 11 in the longitudinal direction of the cylindrical shell 11.

It will be obvious to a person skilled in the art that, as the technology advances, the inventive concept can be implemented in various ways. The invention and its embodiments are not limited to the examples described above but may vary within the scope of the claims.

The invention claimed is:

1. A grate support element configured to support a discharge grate of an open-ended grinding mill devoid of a discharge trunnion, pulp lifters to lift ground material to the discharge trunnion or a solid discharge head plate or a discharge grate of a semi-open-ended grinding mill including a partial head plate at a discharge end extending partially from a perimeter of a shell towards a longitudinal axis of a drum but no discharge trunnion or traditional pulp lifters, whereby ground material is configured to be discharged from the discharge grate straight to the atmosphere, wherein the grate support element comprises:

an outer perimeter section directed away from a middle of a cross section of the open-ended grinding mill in a transverse direction of the open-ended grinding mill, an inner section directed towards the middle of the cross section of the open-ended grinding mill in the transverse direction of the open-ended grinding mill, and a vane extending between the outer perimeter section and the inner section in such a manner that the vane has an inner section side end connected to the inner section and an outer perimeter section side end connected to the outer perimeter section, wherein the grate support element includes a mounting flange at an outer perimeter of the grate support element that is configured to enable mounting of the grate support element to a shell of the open-ended grinding mill at an area of the shell not intruding to a grinding mill volume, the mounting flange extending outwards from the middle of the cross section of the open-ended grinding mill.

2. A The grate support element according to claim 1, wherein the vane is angled with respect to a plane defined by an outer edge of the outer perimeter section in such a manner that the inner section is configured to be provided outwards from the plane defined by the outer edge of the outer perimeter section.

3. The grate support element according to claim 2, wherein the mounting flange is provided with flange openings for bolts for mounting the grate support, the flange openings configured to extend through the mounting flange in a horizontal direction.

4. The grate support element according to claim 2, wherein the mounting flange is configured to extend outwards beyond a diameter of an inner volume of the shell of the grinding mill, when the grate support element is mounted in the grinding mill.

5. The grate support element according to claim 2, wherein the grate support element comprises a mounting surface parallel to the end of the of the shell of the grinding mill.

6. The grate support element according to claim 1, wherein the mounting flange is configured to extend in a radial direction of the grate.

7. The grate support element according to claim 1, wherein the mounting flange is configured to extend at an angle with respect to a radial direction of the grate.

8. The grate support element according to claim 7, wherein the angle of the mounting flange is equal to an angle of the vane at the outer perimeter section side end of the vane.

9. The grate support element according to claim 7, wherein the angle of the mounting flange is different from an angle of the vane at the outer perimeter section side end of the vane.

10. The grate support element according to claim 1, wherein the mounting flange is provided with flange openings for bolts for mounting the grate support, the flange openings configured to extend through the mounting flange in a horizontal direction.

11. The grate support element according to claim 1, wherein the mounting flange is configured to extend outwards beyond a diameter of an inner volume of the shell of the open-ended grinding mill.

12. The grate support element according to claim 1, wherein the grate support element comprises a mounting surface parallel to the end of the of the shell of the open-ended grinding mill.

13. The grate support element according to claim 1, wherein the vane extends between the outer perimeter section and the inner section in a direction radial with respect to the cross section of the open-ended grinding mill in the transverse direction.

14. The grate support element according to claim 1, wherein the vane extends between the outer perimeter section and the inner section in a curved manner.

15. An open-ended grinding mill configured to grind material, comprising:

a shell including an inner volume for the material to be ground; and at least one grate support element mounted to the shell at a discharge end of the grinding mill, the grate support element comprising:

an outer perimeter section directed away from a middle of a cross section of the grinding mill in a transverse direction of the grinding mill, an inner section directed towards the middle of the cross section of the grinding mill in the transverse direction of the grinding mill, and at least one vane extending between the outer perimeter section and the inner section in such a manner that the vane has an inner section side end connected to the inner section and an outer perimeter section side end connected to the outer perimeter section, wherein the grate support element includes a mounting flange at an outer perimeter of the grate support element that is configured to enable mounting of the grate support element to a shell of the grinding mill at an area of the shell not intruding to the grinding mill volume, the mounting flange extending outwards from the middle of the cross section of the grinding mill, wherein the open-ended grinding mill is either a fully open-ended grinding mill, wherein the fully open-ended grinding mill does not have a discharge trunnion, pulp lifters to lift ground material to the discharge trunnion or a solid discharge head plate, or a semi-open-ended grinding mill, wherein the semi-open-ended grinding mill includes a partial head plate at the discharge end extending partially from a perimeter of a shell towards a longitudinal axis of a drum but no discharge trunnion or pulp lifters, whereby the ground material is configured to be discharged from the discharge grate straight to the atmosphere.

16. The open-ended grinding mill according to claim 15, wherein the shell comprises a shell flange extending in a radial direction away from the inner volume of the shell, and wherein the grate support element is mounted via the mounting flange to the shell flange.

17. The open-ended grinding mill according to claim 16, wherein the mounting flange and the shell flange are provided with flange openings for bolts for mounting the grate support element to the shell, at least some of the flange openings in the mounting flange are configured to be aligned with the flange openings in the shell flange when the grate support element is mounted to the shell, and wherein the grate support element is mounted to the shell by bolts extending in a horizontal direction through the flange openings in both the mounting flange and the shell flange.

* * * * *